United States Patent
Radi et al.

(10) Patent No.: US 12,149,358 B2
(45) Date of Patent: Nov. 19, 2024

(54) IN-NETWORK FAILURE INDICATION AND RECOVERY

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/353,781

(22) Filed: Jun. 21, 2021

(65) Prior Publication Data

US 2022/0407625 A1 Dec. 22, 2022

(51) Int. Cl.
*H04L 1/00* (2006.01)
*H04L 1/1607* (2023.01)
*H04L 41/06* (2022.01)
*H04L 41/0604* (2022.01)

(52) U.S. Cl.
CPC .......... *H04L 1/1678* (2013.01); *H04L 1/0041* (2013.01); *H04L 1/0045* (2013.01); *H04L 1/0082* (2013.01); *H04L 41/0627* (2013.01); *H04L 2001/0093* (2013.01); *H04L 41/06* (2013.01)

(58) Field of Classification Search
CPC ... H04L 1/0041; H04L 1/0045; H04L 1/0082; H04L 1/1678; H04L 41/06; H04L 41/0627; H04L 2001/0093
See application file for complete search history.

(56) References Cited

U.S. PATENT DOCUMENTS

| | | |
|---|---|---|
| 6,044,438 A | 3/2000 | Olnowich |
| 6,078,997 A | 6/2000 | Young et al. |
| 6,108,737 A | 8/2000 | Sharma et al. |
| 6,209,065 B1 | 3/2001 | Van Doren et al. |
| 6,230,243 B1 | 5/2001 | Elko et al. |
| 6,263,404 B1 | 7/2001 | Borkenhagen et al. |
| 6,298,418 B1 | 10/2001 | Fujiwara et al. |
| 6,343,346 B1 | 1/2002 | Olnowich |

(Continued)

FOREIGN PATENT DOCUMENTS

| | | | |
|---|---|---|---|
| KR | 102163279 B1 | 10/2020 | |
| WO | WO-2020226701 A1 * | 11/2020 | ......... G06F 12/0802 |

OTHER PUBLICATIONS

Sabella "Using eBPF for network traffic analysis" https://www.ntop.org/wp-content/uploads/2018/10/Sabella.pdf (Year: 2018).*

(Continued)

*Primary Examiner* — Aftab N. Khan
*Assistant Examiner* — Patrick F Ngankam
(74) *Attorney, Agent, or Firm* — Barry IP Law, P.C.

(57) ABSTRACT

A programmable switch includes a plurality of ports for communicating with a plurality of network devices. A packet for a distributed system is received via a port and at least one indicator is identified in the received packet. Reliability metadata associated with a network device used for the distributed system is generated using the at least one indicator. The generated reliability metadata is sent to a controller for the distributed system for predicting or determining a reliability of at least one of the network device and a communication link for the network device and the programmable switch.

20 Claims, 5 Drawing Sheets

(56) References Cited

U.S. PATENT DOCUMENTS

| | | | |
|---|---|---|---|
| 6,775,804 B1* | 8/2004 | Dawson | H04L 41/0631 |
| | | | 714/776 |
| 6,829,683 B1 | 12/2004 | Kuskin | |
| 6,868,439 B2 | 3/2005 | Basu et al. | |
| 6,954,844 B2 | 10/2005 | Entz et al. | |
| 6,993,630 B1 | 1/2006 | Williams et al. | |
| 7,032,078 B2 | 4/2006 | Cypher et al. | |
| 7,376,799 B2 | 5/2008 | Veazey et al. | |
| 7,673,090 B2 | 3/2010 | Kaushik et al. | |
| 7,716,425 B1 | 5/2010 | Uysal et al. | |
| 7,975,025 B1 | 7/2011 | Szabo et al. | |
| 8,166,251 B2 | 4/2012 | Luttrell | |
| 8,281,075 B2 | 10/2012 | Arimilli et al. | |
| 9,088,592 B1 | 7/2015 | Craft et al. | |
| 9,313,604 B1 | 4/2016 | Holcombe | |
| 9,442,850 B1 | 9/2016 | Rangarajan et al. | |
| 9,467,380 B2 | 10/2016 | Hong et al. | |
| 9,712,381 B1 | 7/2017 | Emanuel et al. | |
| 9,819,739 B2 | 11/2017 | Hussain et al. | |
| 9,825,862 B2 | 11/2017 | Bosshart | |
| 9,826,071 B2 | 11/2017 | Bosshart | |
| 9,880,768 B2 | 1/2018 | Bosshart | |
| 9,910,615 B2 | 3/2018 | Bosshart | |
| 9,912,610 B2 | 3/2018 | Bosshart et al. | |
| 9,923,816 B2 | 3/2018 | Kim et al. | |
| 9,936,024 B2 | 4/2018 | Malwankar et al. | |
| 9,940,056 B2 | 4/2018 | Bosshart | |
| 10,038,624 B1 | 7/2018 | Cruz et al. | |
| 10,044,583 B2 | 8/2018 | Kim et al. | |
| 10,050,854 B1 | 8/2018 | Licking et al. | |
| 10,063,407 B1 | 8/2018 | Kodeboyina et al. | |
| 10,063,479 B2 | 8/2018 | Kim et al. | |
| 10,063,638 B2 | 8/2018 | Huang | |
| 10,067,967 B1 | 9/2018 | Bosshart | |
| 10,075,567 B1 | 9/2018 | Licking et al. | |
| 10,078,463 B1 | 9/2018 | Bosshart | |
| 10,084,687 B1 | 9/2018 | Sharif et al. | |
| 10,110,454 B2 | 10/2018 | Kim et al. | |
| 10,127,983 B1 | 11/2018 | Peterson et al. | |
| 10,133,499 B2 | 11/2018 | Bosshart | |
| 10,146,527 B2 | 12/2018 | Olarig et al. | |
| 10,158,573 B1 | 12/2018 | Lee et al. | |
| 10,164,829 B1 | 12/2018 | Watson et al. | |
| 10,169,108 B2 | 1/2019 | Gou et al. | |
| 10,225,381 B1 | 3/2019 | Bosshart | |
| 10,230,810 B1 | 3/2019 | Bhide et al. | |
| 10,237,206 B1 | 3/2019 | Agrawal et al. | |
| 10,257,122 B1 | 4/2019 | Li et al. | |
| 10,268,634 B1 | 4/2019 | Bosshart et al. | |
| 10,298,456 B1 | 5/2019 | Chang | |
| 10,496,566 B2 | 12/2019 | Olarig et al. | |
| 10,503,679 B2 | 12/2019 | Huang | |
| 10,628,353 B2 | 4/2020 | Prabhakar et al. | |
| 10,635,316 B2 | 4/2020 | Singh et al. | |
| 10,742,557 B1 | 8/2020 | Miriyala | |
| 10,761,995 B2 | 9/2020 | Blaner et al. | |
| 10,812,388 B2 | 10/2020 | Thubert et al. | |
| 10,880,204 B1 | 12/2020 | Shalev et al. | |
| 2003/0009637 A1 | 1/2003 | Arimilli et al. | |
| 2003/0028819 A1 | 2/2003 | Chiu et al. | |
| 2003/0158999 A1 | 8/2003 | Hauck et al. | |
| 2004/0044850 A1 | 3/2004 | George et al. | |
| 2004/0073699 A1 | 4/2004 | Hong et al. | |
| 2004/0260883 A1 | 12/2004 | Wallin et al. | |
| 2005/0058149 A1 | 3/2005 | Howe | |
| 2006/0265568 A1 | 11/2006 | Burton | |
| 2006/0271598 A1 | 11/2006 | Wong et al. | |
| 2007/0067382 A1 | 3/2007 | Sun | |
| 2008/0010409 A1 | 1/2008 | Rao et al. | |
| 2009/0213850 A1* | 8/2009 | Viger | H04L 47/40 |
| | | | 709/228 |
| 2009/0240664 A1 | 9/2009 | Dinker et al. | |
| 2009/0240869 A1 | 9/2009 | O'Krafka et al. | |
| 2009/0313503 A1 | 12/2009 | Atluri et al. | |
| 2010/0008260 A1 | 1/2010 | Kim et al. | |
| 2010/0223322 A1 | 9/2010 | Mott et al. | |
| 2011/0004729 A1 | 1/2011 | Akkawi et al. | |
| 2011/0093925 A1 | 4/2011 | Krishnamoorthy et al. | |
| 2011/0238923 A1 | 9/2011 | Hooker et al. | |
| 2012/0110108 A1 | 5/2012 | Li et al. | |
| 2012/0155264 A1 | 6/2012 | Sharma et al. | |
| 2013/0254325 A1 | 9/2013 | Song et al. | |
| 2013/0263249 A1 | 10/2013 | Song et al. | |
| 2014/0219284 A1 | 8/2014 | Chau et al. | |
| 2014/0241361 A1 | 8/2014 | Bosshart et al. | |
| 2014/0269413 A1 | 9/2014 | Hui et al. | |
| 2014/0269716 A1 | 9/2014 | Pruss et al. | |
| 2014/0278575 A1 | 9/2014 | Anton et al. | |
| 2014/0331001 A1 | 11/2014 | Liu et al. | |
| 2014/0362709 A1 | 12/2014 | Kashyap et al. | |
| 2015/0195216 A1 | 7/2015 | Di Pietro et al. | |
| 2015/0301949 A1 | 10/2015 | Koka et al. | |
| 2015/0319243 A1 | 11/2015 | Hussain et al. | |
| 2015/0378919 A1 | 12/2015 | Anantaraman et al. | |
| 2016/0050150 A1 | 2/2016 | Venkatesan et al. | |
| 2016/0099872 A1 | 4/2016 | Kim et al. | |
| 2016/0127492 A1 | 5/2016 | Malwankar et al. | |
| 2016/0134531 A1 | 5/2016 | Assarpour et al. | |
| 2016/0156558 A1 | 6/2016 | Hong et al. | |
| 2016/0216913 A1 | 7/2016 | Bosshart | |
| 2016/0246507 A1 | 8/2016 | Bosshart | |
| 2016/0246535 A1 | 8/2016 | Bosshart | |
| 2016/0294451 A1 | 10/2016 | Jung et al. | |
| 2016/0315964 A1 | 10/2016 | Shetty et al. | |
| 2016/0323189 A1 | 11/2016 | Ahn et al. | |
| 2017/0026292 A1 | 1/2017 | Smith et al. | |
| 2017/0054618 A1 | 2/2017 | Kim | |
| 2017/0054619 A1 | 2/2017 | Kim | |
| 2017/0063690 A1 | 3/2017 | Bosshart | |
| 2017/0064047 A1 | 3/2017 | Bosshart | |
| 2017/0093707 A1 | 3/2017 | Kim et al. | |
| 2017/0093986 A1 | 3/2017 | Kim et al. | |
| 2017/0093987 A1 | 3/2017 | Kaushalram et al. | |
| 2017/0187846 A1* | 6/2017 | Shalev | H04L 1/1835 |
| 2017/0214599 A1 | 7/2017 | Seo et al. | |
| 2017/0286363 A1 | 10/2017 | Joshua et al. | |
| 2017/0310594 A1 | 10/2017 | Kotha et al. | |
| 2017/0371790 A1 | 12/2017 | Dwiel et al. | |
| 2018/0034740 A1 | 2/2018 | Beliveau et al. | |
| 2018/0060136 A1 | 3/2018 | Herdrich et al. | |
| 2018/0167352 A1 | 6/2018 | Worley et al. | |
| 2018/0173448 A1 | 6/2018 | Bosshart | |
| 2018/0176324 A1 | 6/2018 | Kumar et al. | |
| 2018/0234340 A1 | 8/2018 | Kim et al. | |
| 2018/0234355 A1 | 8/2018 | Kim et al. | |
| 2018/0239551 A1 | 8/2018 | Bosshart | |
| 2018/0242191 A1 | 8/2018 | Lundqvist et al. | |
| 2018/0260135 A1 | 9/2018 | Hayashida et al. | |
| 2018/0260330 A1 | 9/2018 | Felter et al. | |
| 2018/0262459 A1 | 9/2018 | Wang et al. | |
| 2018/0285275 A1 | 10/2018 | Barczak et al. | |
| 2018/0329818 A1 | 11/2018 | Cheng et al. | |
| 2018/0335953 A1 | 11/2018 | Ramaswamy et al. | |
| 2018/0337860 A1 | 11/2018 | Kim et al. | |
| 2018/0349163 A1 | 12/2018 | Gao et al. | |
| 2018/0349285 A1 | 12/2018 | Ish et al. | |
| 2019/0012278 A1 | 1/2019 | Sindhu et al. | |
| 2019/0044878 A1 | 2/2019 | Steffen et al. | |
| 2019/0050333 A1 | 2/2019 | Chacon et al. | |
| 2019/0058646 A1 | 2/2019 | Kim et al. | |
| 2019/0087341 A1 | 3/2019 | Pugsley et al. | |
| 2019/0146675 A1 | 5/2019 | Subramanian et al. | |
| 2019/0146907 A1 | 5/2019 | Frolikov | |
| 2019/0196987 A1 | 6/2019 | Shen et al. | |
| 2019/0220429 A1 | 7/2019 | Ranjan et al. | |
| 2019/0227921 A1 | 7/2019 | Frolikov | |
| 2019/0342785 A1 | 11/2019 | Li et al. | |
| 2019/0354402 A1 | 11/2019 | Bivens et al. | |
| 2019/0370176 A1 | 12/2019 | Priyadarshi et al. | |
| 2019/0391928 A1 | 12/2019 | Lin | |
| 2019/0394261 A1 | 12/2019 | DeCusatis et al. | |
| 2020/0007408 A1* | 1/2020 | Siddappa | H04L 41/0659 |
| 2020/0050402 A1 | 2/2020 | Furey et al. | |
| 2020/0065269 A1 | 2/2020 | Balasubramani et al. | |

(56) References Cited

U.S. PATENT DOCUMENTS

| | | |
|---|---|---|
| 2020/0068014 A1 | 2/2020 | Sarkar et al. |
| 2020/0089619 A1 | 3/2020 | Hsu et al. |
| 2020/0097212 A1 | 3/2020 | Lakshman et al. |
| 2020/0151104 A1 | 5/2020 | Yang |
| 2020/0213156 A1 | 7/2020 | Cheng et al. |
| 2020/0226068 A1 | 7/2020 | Gellerich et al. |
| 2020/0233823 A1 | 7/2020 | Zhang |
| 2020/0250099 A1 | 8/2020 | Campbell et al. |
| 2020/0259763 A1 | 8/2020 | Guim Bernat et al. |
| 2020/0293499 A1 | 9/2020 | Kohli et al. |
| 2020/0313999 A1 | 10/2020 | Lee et al. |
| 2020/0349080 A1 | 11/2020 | Radi et al. |
| 2020/0351370 A1 | 11/2020 | Radi et al. |
| 2020/0379668 A1 | 12/2020 | Akaike et al. |
| 2020/0379922 A1 | 12/2020 | Kumar et al. |
| 2021/0034250 A1 | 2/2021 | Mizuno et al. |
| 2021/0034270 A1 | 2/2021 | Gupta et al. |
| 2021/0049078 A1 | 2/2021 | Khan et al. |
| 2021/0051751 A1 | 2/2021 | Pawar |
| 2021/0073086 A1 | 3/2021 | Subraya et al. |
| 2021/0141910 A1 | 5/2021 | Numata |
| 2021/0149807 A1 | 5/2021 | Gupta et al. |
| 2021/0173589 A1 | 6/2021 | Benisty et al. |
| 2021/0194828 A1 | 6/2021 | He et al. |
| 2021/0218623 A1 | 7/2021 | Jain et al. |
| 2021/0247935 A1 | 8/2021 | Beygi et al. |
| 2021/0266219 A1 | 8/2021 | Kim et al. |
| 2021/0286540 A1 | 9/2021 | Tylik et al. |
| 2021/0294506 A1 | 9/2021 | Tadokoro |
| 2021/0311899 A1 | 10/2021 | Smith et al. |
| 2021/0318828 A1 | 10/2021 | Valtonen |
| 2022/0210220 A1 | 6/2022 | Shivanna et al. |

OTHER PUBLICATIONS

Intel Corporation: "IN-BAND network telemetry detects network performance issues", https://builders.intel.com/docs/networkbuilders/in-band-network-telemetry-detects-network-performance-issues.pdf (Year: 2020).*

Intel Corporation: "IN-BAND network telemetry detects network performance issues", https://networkbuilders.intel.com/docs/networkbuilders/in-band-network-telemetry-detects-network-performance-issues.pdf (Year: 2020).*

Intel Corporation: "IN-BAND network telemetry detects network performance issues", https://networkbuilders.intel.com/solutionslibrary/in-band-network-telemetry-detects-network-performance-issues (Year: 2020).*

Intel "In-Band Network Telemetry Detects Performance Issues", chrome-extension://efaidnbmnnnibpcajpcglclefindmkaj/https://networkbuilders.intel.com/docs/networkbuilders/in-band-network-telemetry-detects-network-performance-issues.pdf (Year: 2020).*

International Search Report and Written Opinion dated Oct. 28, 2021 from International Application No. PCT/US2021/039070, 7 pages.

Liu et al.; "DistCache: provable load balancing for large-scale storage systems with distributed caching"; FAST '19: Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

Wang et al.; "Concordia: Distributed Shared Memory with in-Network Cache Coherence"; 19th USENIX Conference on File and Storage Technologies; pp. 277-292; Feb. 2021.

International Search Report and Written Opinion dated Jun. 1, 2022 from International Application No. PCT/US2022/017608, 7 pages.

Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.

International Search Report and Written Opinion dated Jul. 7, 2022 from International Application No. PCT/US2022/017633, 7 pages.

Hashemi et al.; "Learning Memory Access Patters"; 15 pages; Mar. 6, 2018; available at https://arxiv.org/pdf/1803.02329.pdf.

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/174,681, filed Feb. 12, 2021, entitled "Devices and Methods for Network Message Sequencing", Marjan Radi et al.

Pending U.S. Appl. No. 17/175,449, filed Feb. 12, 2021, entitled "Management of Non-Volatile Memory Express Nodes", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACTOR"; Apr. 2-4, 2014; 16 pages; USENIX; available at: https://www.usenix.org/system/files/conference/nsdi14/nsdi14-paper-liu_he.pdf.

International Search Report and Written Opinion dated Apr. 27, 2020 from International Application No. PCT/US2019/068269, 6 pages.

Leslie Lamport; "Paxos Made Simple"; Nov. 1, 2001; available at: https://lamport.azurewebsites.net/pubs/paxos-simple.pdf.

Paul Krzyzanowski; "Understanding Paxos"; PK.org; Distributed Systems; Nov. 1, 2018; available at: https://www.cs.rutgers.edu/~pxk/417/notes/paxos.html.

Wikipedia; Paxos (computer science); accessed on Jun. 27, 2020; available at: https://en.wikipedia.org/wiki/Paxos_(computer_science).

Pending U.S. Appl. No. 16/916,730, filed Jun. 30, 2020, entitled "Devices and Methods for Failure Detection and Recovery for a Distributed Cache", Radi et al.

Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at: https://www.juniper.net/documentation/en_us/junos/topics/task/configuration/cos-priority-flow-control-cli-ex-series.html.

Pending U.S. Appl. No. 16/914,206, filed Jun. 26, 2020, entitled "Devices and Methods for Managing Network Traffic for a Distributed Cache", Radi et al..

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

(56) References Cited

OTHER PUBLICATIONS

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Stefanovici et al.; "Software-Defined Caching: Managing Caches in Multi-Tenant Data Centers"; Aug. 2015; bages 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Telecommunications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

Pending U.S. Appl. No. 16/548,116, filed Aug. 22, 2019, entitled "Distributed Cache With In-Network Prefetch", Marjan Radi et al.

Pending U.S. Appl. No. 17/331,453, filed May 26, 2021, entitled "Distributed Cache Management", Marjan Radi et al.

Brar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

\* cited by examiner

IN-NETWORK FAILURE INDICATION AND RECOVERY

CROSS-REFERENCE TO RELATED APPLICATIONS

This application is related to U.S. application Ser. No. 16/548,116 titled "DISTRIBUTED CACHE WITH IN-NETWORK PREFETCH", filed on Aug. 22, 2019, and published as U.S. Patent Application Publication No. 2020/0349080 on Nov. 5, 2020, which is hereby incorporated by reference in its entirety. This application is also related to U.S. application Ser. No. 16/697,019 titled "FAULT TOLERANT DATA COHERENCE IN LARGE-SCALE DISTRIBUTED CACHE SYSTEMS", filed on Nov. 26, 2019, and published as U.S. Patent Application Publication No. 2020/0351370 on Nov. 5, 2020, which is hereby incorporated by reference in its entirety. This application is also related to U.S. application Ser. No. 16/914,206 titled "DEVICES AND METHODS FOR MANAGING NETWORK TRAFFIC FOR A DISTRIBUTED CACHE", filed on Jun. 26, 2020, which is hereby incorporated by reference in its entirety. This application is also related to U.S. application Ser. No. 16/916,730 titled "DEVICES AND METHODS FOR FAILURE DETECTION AND RECOVERY FOR A DISTRIBUTED CACHE", filed on Jun. 30, 2020, which is hereby incorporated by reference in its entirety. This application is also related to U.S. application Ser. No. 17/174,681, titled "DEVICES AND METHODS FOR NETWORK MESSAGE SEQUENCING", filed on Feb. 12, 2021, which is hereby incorporated by reference in its entirety. This application is also related to U.S. application Ser. No. 17/175,449, titled "MANAGEMENT OF NON-VOLATILE MEMORY EXPRESS NODES", filed on Feb. 12, 2021, which is hereby incorporated by reference in its entirety. This application is also related to U.S. application Ser. No. 17/331,453, titled "DISTRIBUTED MEMORY SYSTEM MANAGEMENT", filed on May 26, 2021, which is hereby incorporated by reference in its entirety.

BACKGROUND

Current trends in cloud computing, big data, and Input/Output (I/O) intensive applications have led to greater needs for high performance distributed systems in data centers in terms of low latency, high throughput, and bandwidth. Although protocols such as Non-Volatile Memory express (NVMe) have been extended over networks, such as with NVMe over Fabrics (NVMeOF), to support access to high performance NVMe devices, such as NVMe Solid-State Drives (SSDs), distributed systems are susceptible to network errors due to unreliable networks, such as with an Ethernet network, and errors at various devices in the network. Such errors can cause significant data loss and service down time that can greatly affect system performance.

Existing data center fault-tolerance approaches are typically based on reactive failure detection and recovery techniques such as erasure coding to recover data after a failure occurs. Replication is often used in distributed systems to provide fault tolerance for hardware failures. Existing error detection and recovery relies heavily on the end-hosts to detect errors in received data and to correct the errors in received data. If the end-host fails to recover the data, the original sender will usually need to retransmit the lost or corrupted data. In this case, the latency for error recovery depends on multiple factors such as the number of links and nodes between the original sender and the end-host, and the links' speed and packet processing delays of nodes between the original sender and the end-host.

The latency overhead of reconstructing lost or corrupted data by the end-host and retransmitting lost or corrupted data negatively affects the performance benefits that can be achieved by using high performance devices, such as NVMe SSDs in a distributed system. In addition, these fault-tolerance approaches require storing extra data for the recovery process, which affects the amount of data that can be stored in the distributed system and reduces network data transfer efficiency. Moreover, reactively dealing with failures after they occur can cause a significant degradation in service and even system downtime.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

SYSTEM EXAMPLES

Figure 1:
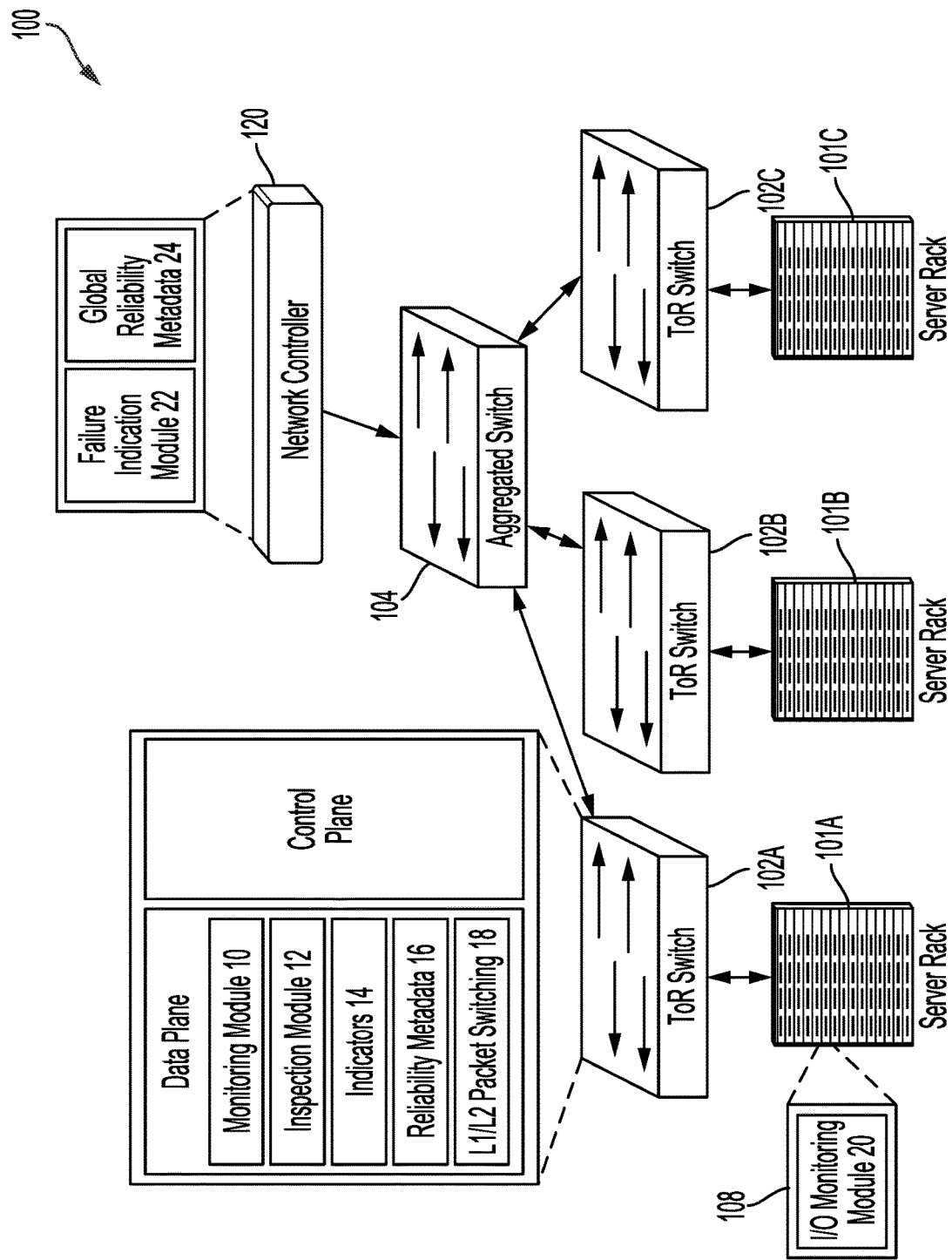
FIG. 1 illustrates a system environment for implementing a distributed system according to one or more embodiments.

FIG. 1 illustrates an example network 100 for implementing a distributed system according to one or more embodiments. As shown in FIG. 1, server racks 101A, 101B, and 101C use Top of Rack (ToR) switches 102A, 102B, and 102C, respectively, to communicate with other devices in network 100. Each server rack 101 includes one or more network devices, such as network device 108 in FIG. 2, that can access memory blocks, and/or processing resources in other network devices in network 100. The network devices in server racks 101 can include, for example, servers or processing nodes, such as Reduced Instruction Set Computer (RISC)-V cores, and memory devices, such as Solid-State Drives (SSDs) or Hard Disk Drives (HDDs). In some implementations, network 100 in FIG. 1 may be used as at least part of a data center and/or for distributed processing, such as for distributed machine learning or big data analysis.

Network 100 can include, for example, a Storage Area Network (SAN), a Local Area Network (LAN), and/or a Wide Area Network (WAN), such as the Internet. In this regard, one or more of server racks 101, ToR switches 102, aggregated switch 104, and/or network controller 120 may not be physically co-located. Server racks 101, ToR switches 102, aggregated switch 104, and/or network controller 120 may communicate using one or more standards such as, for example, Ethernet.

As shown in the example of FIG. 1, each of server racks 101A, 101B, and 101C is connected to a ToR or edge switch 102. In other implementations, each rack 101 may communicate with multiple ToR or edge switches 102 for redundancy. ToR switches 102 can include programmable switches, such as 64 port ToR P4 programmable switches that route messages to and from nodes or network devices located in server racks 101. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as a ToR switch 102 can include, for example, a Cavium Xpliant programmable switch or a Broadcom Trident 3 programmable switch. As discussed in more detail below, each ToR switch 102 can generate metadata for predicting or determining the reliability of one or more devices for a distributed system, such as for a distributed memory system or a distributed processing system.

Aggregated switch 104 routes messages between the ToR switches 102 and network controller 120. In some implementations, server racks 101A, 101B, and 101C with ToR switches 102A, 102B, and 102C, and aggregated switch 104 may be viewed as a cluster of devices on network 100. In this regard, those of ordinary skill in the art will appreciate that the network 100 can include many more network devices than those shown in the example of FIG. 1. For instance, network 100 may include other clusters of server racks 101, ToR switches 102, and aggregated switches 104. As another example, network 100 may include additional levels such as with one or more core switches located between network controller 120 and aggregated switch 104.

In this regard, different paths between the network devices of server racks 101 form different communication links or paths. In some implementations, multiple communication links may be available for sending and receiving data between the network devices. For example, some implementations may include backup ToR switches 102 for each rack 101 to provide a different communication link and/or additional aggregated switches 104 that provide more than one communication link between network devices, switches, and/or network controller 120.

Aggregated switch 104 can include a programmable switch, such as a 64 port ToR P4 programmable switch that routes messages to and from ToR switches 102 and network controller 120. Such a programmable switch can include, for example, a Barefoot Networks Tofino ASIC with ports configured to provide 40 Gigabit Ethernet (GE) frame rates. Other types of programmable switches that can be used as an aggregated switch 104 can include, for example, a Cavium Xpliant programmable switch or a Broadcom Trident 3 programmable switch.

Network controller 120 can include a Software Defined Networking (SDN) controller. As discussed in more detail below, network controller 120 can store global reliability metadata 24 for a distributed system implemented by different nodes or network devices in network 100. Global reliability metadata 24 can be updated based on reliability metadata received from programmable switches, such as ToR switches 102, and used by failure indication module 22 to determine or predict the reliability of different network devices and/or communication links used for the distributed system.

In this regard, ToR switches 102 are configured to inspect packets received by the ToR switch to identify indicators in packets for the distributed system and generate reliability metadata using the identified indicators that can be used by network controller 120 to predict or determine a reliability of at least one of the network devices and communication links. The identified indicators can include, for example, a Cyclic Redundancy Check (CRC) value, a timestamp, a message acknowledgment, and/or a message sequence number. The ToR switch 102 can inspect the packets it receives using inspection module 12 and generate reliability metadata 16 using indicators 14. ToR switch 102 can then send the reliability metadata 16, or a portion thereof, to network controller 120. Reliability metadata 16 can include, for example, an indication of a transmission time for one or more packets, a count of corrupted packets, and/or a number of out-of-sequence packets.

In some implementations, ToR switch 102 may also use monitoring module 10 to monitor operations for at least one network device of the distributed system to generate metadata for reliability metadata 16. In such implementations, monitoring module 10 may include, for example, an extended Berkeley Packet Filter (eBPF) executed by circuitry of ToR switch 102 (e.g., circuitry 132 in FIG. 2). Monitoring module 10 may be used to generate additional reliability metadata based on monitored operations of the least one network device, such as operations for accessing a cache memory stored at network device 108 that is shared with other network devices. The monitored operations can include, for example, changes in data traffic for the at least one network device, packet drops for packets received from the at least one network device, and corrupted messages received from the at least one network device.

ToR switches 102 may also use monitoring module 10 to determine a port status or interface status associated with one or more network devices and generate metadata for reliability metadata 16 based on the determined port status or interface status. For example, ToR switch 102A may determine that the status of a port is unavailable or cycles between being on and off more than a threshold number of state changes during a period of time. Such a high frequency cycling in port or interface status can indicate that the corresponding communication link is not reliable between the ToR switch 102A and the network device. ToR switch 102A may then add an indication of this unreliability to reliability metadata 16 for the network device 120 to use in determining reliability.

In addition, network device 108 shown in FIG. 1 may execute I/O monitoring module 20 to generate reliability metadata such as, for example, a number of reads and/or writes to a shared memory of the network device and an indication of errors, such as unrecoverable errors and/or parity errors. Network device 108 can provide such metadata to ToR switch 102A to add to reliability metadata 16, which may be provided to network controller 120 for predicting or determining a reliability of network device 108.

In some implementations, ToR switches 102 and aggregated switch 104 can include, for example, programmable switches that can be programmed to handle different custom protocols. Programmable switches 102 and 104 can include programmable match-action pipelines to provide a configurable data plane and customized packet processing capability with L1/L2 packet switching 18. Examples of such programmable switches can be found in co-pending U.S. application Ser. Nos. 17/174,681, 16/914,206, and 16/916,730, and U.S. Patent Application Publication Nos. 2020/0349080 and 2020/0351370, each of which are incorporated by reference above.

Data planes of programmable switches 102 and 104 in the example of FIG. 1 can control point-to-point packet forwarding behavior of the programmable switch, such as with L1/L2 Ethernet packet switching, packet admission control, and scheduling or queuing. Data planes of programmable switches 102 and 104 are programmable and separate from higher-level control planes that determine end-to-end routes for packets or messages between devices in network 100.

In some implementations, ToR switches 102 may serve as Non-Volatile Memory express (NVMe) controllers for NVMe nodes in their respective server racks 101. In such implementations, ToR switches 102 can update available namespaces in an NVMe mapping for the server rack and/or perform an NVMe discovery process to determine whether there are one or more newly available namespaces. Such implementations are discussed in more detail in co-pending U.S. application Ser. No. 17/175,449, which is incorporated by reference above.

In addition, the use of programmable switches 102 and 104 can enable the configuration of high-performance and scalable memory centric architectures by defining customized packet formats and processing behavior. Programmable switches 102 and 104 enable a protocol-independent switch architecture and the use of off-the-shelf switches, as opposed to specially designed Networks on a Chip (NoCs). The processing resources of programmable switches 102 and 104, such as the use of Content Addressable Memory (CAM) or Ternary CAM (TCAM) tables, or other types of match-action tables, can ordinarily provide faster processing and deep packet inspection, such as inspection of NVMe messages within a packet, than can occur at the end nodes. As discussed in more detail below, this can enable faster identification of failures or unreliability in the distributed system.

Those of ordinary skill in the art will appreciate with reference to the present disclosure that other implementations may include a different number or arrangement of server racks 101, ToR switches 102, and aggregated switches 104 than shown in the example of FIG. 1. In this regard, network 100 shown in FIG. 1 is for the purposes of illustration, and those of ordinary skill in the art will appreciate that network 100 may include many more server racks 101, switches or routers than shown in the example of FIG. 1. Other implementations may include additional levels in network 100 that may include core switches, additional servers and/or other programmable switches. In some variations, aggregated switch 104 may be omitted.

In addition, some implementations may include a different arrangement of modules, such as a single module executed by a ToR switch 102 for inspecting packets, generating metadata, monitoring operations of at least one network device, and/or port or interface statuses. In yet other implementations, reliability metadata 16 may be stored in different locations than shown in FIG. 1, such as at a node within a server rack 101 instead of at a ToR switch 102. Similarly, global reliability metadata 24 collected by network controller 120 may be stored at a different location than at network controller 120 in other implementations.

Figure 2:
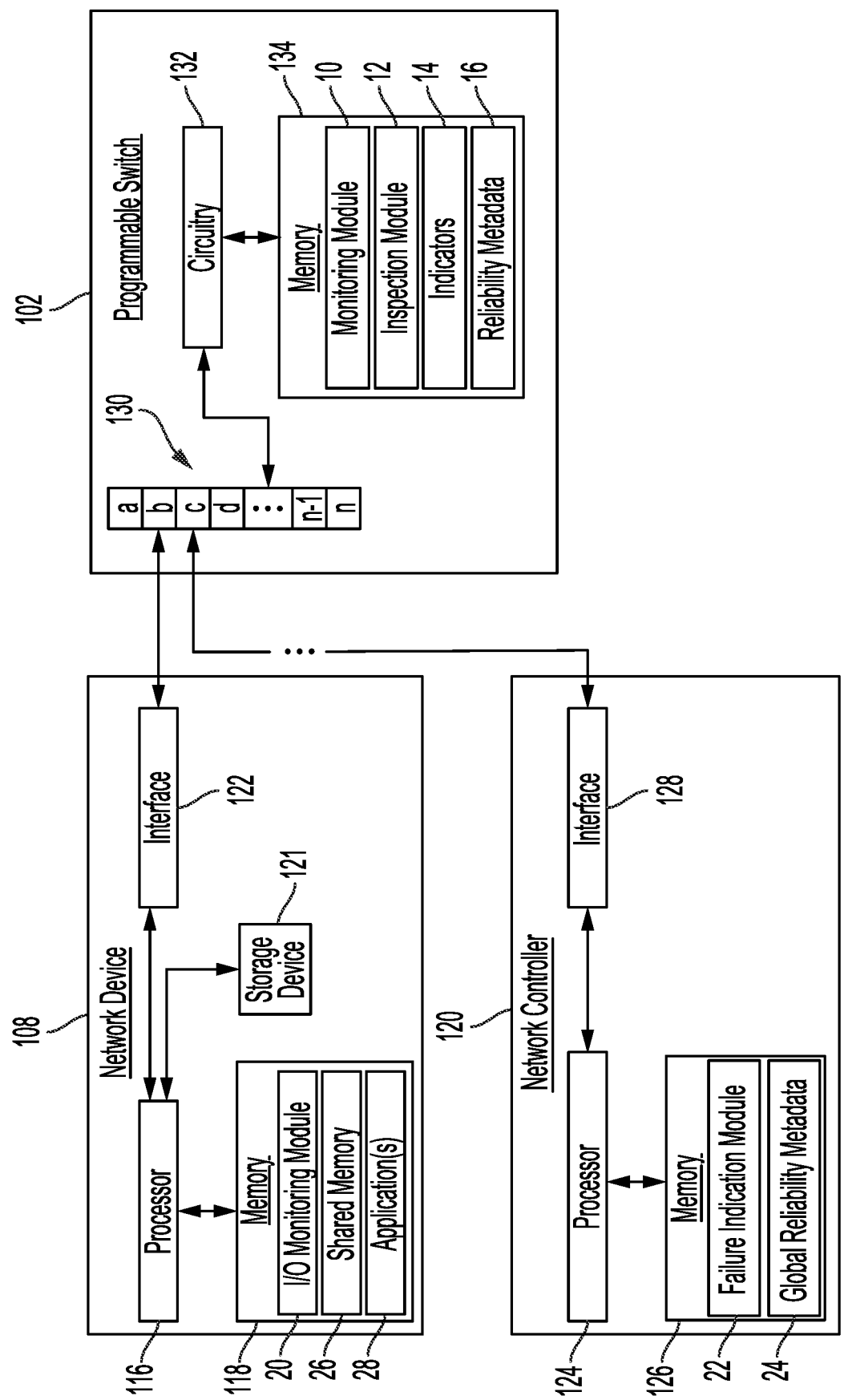
FIG. 2 is a block diagram of example components included in the system environment of FIG. 1 according to one or more embodiments.

FIG. 2 is a block diagram of example components included in network 100 of FIG. 1 according to one or more embodiments. As shown in FIG. 2, network device 108 includes processor 116, memory 118, storage device 121, and interface 122 for communicating on network 100. Network device 108 may be included as part of server rack 101A, for example, in FIG. 1. Although only network device 108 is shown in the example of FIG. 2, other nodes in network 100 may have similar or different components as network device 108.

Processor 116 can execute instructions, such as instructions from I/O monitoring module 20 and application(s) 28, which may include an Operating System (OS) and/or other applications used by network device 108. Processor 116 can include circuitry such as a Central Processing Unit (CPU), one or more RISC-V cores, a Graphics Processing Unit (GPU), a microcontroller, a Digital Signal Processor (DSP), an ASIC, a Field Programmable Gate Array (FPGA), hard-wired logic, analog circuitry and/or a combination thereof. In some implementations, processor 116 can include a System on a Chip (SoC), which may be combined with one or both of memory 118 and interface 122.

Memory 118 can include, for example, a volatile Random Access Memory (RAM) such as Static RAM (SRAM), Dynamic RAM (DRAM), a non-volatile RAM, or other solid-state memory that is used by processor 116 as an internal main memory to store data. Data stored in memory 118 can include data read from storage device 121, data to be stored in storage device 121, instructions loaded from I/O monitoring module 20 or application(s) 28 for execution by processor 116, and/or data used in executing such applications. In addition to loading data from memory 118, processor 116 may also load data from shared memory locations of other network devices as an external memory or distributed memory system. Such data may also be flushed after modification by processor 116 or evicted without modification back to memory 118 or an external network device via programmable switch 102.

As shown in FIG. 2, memory 118 stores cache 26, which can be a shared cache that is shared with other network devices in network 100. In some implementations, I/O monitoring module 20 may collect information on usage of cache 26 and/or error information related to data accessed in cache 26, such as errors in reading data from cache 26 or in writing data to cache 26.

Storage device 121 serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, electrically erasable programmable read only memory (EEPROM), other discrete Non-Volatile Memory (NVM) chips, or any combination thereof.

Interface 122 is configured to interface network device 108 with programmable switch 102. Interface 122 may communicate using a standard such as, for example, Ethernet. In this regard, network device 108, programmable switch 102, and network controller 120 may not be physically co-located and may communicate over a network such as a LAN or a WAN. As will be appreciated by those of ordinary skill in the art, interface 122 can be included as part of processor 116.

As discussed above with reference to FIG. 1, programmable switch 102 can be a ToR switch for a server rack 101 including network device 108. In the example of FIG. 2, programmable switch 102 includes ports 130, circuitry 132, and memory 134. Ports 130 provide a connection and are configured to communicate with devices, such as nodes, network controller 120, and aggregated switch 104. For example, ports 130 may include Ethernet ports.

Memory 134 of programmable switch 102 can include, for example, a volatile RAM such as DRAM, or a non-volatile RAM or other solid-state memory such as register arrays that are used by circuitry 132 to execute instructions loaded from cache monitoring module 10, inspection module 12, or firmware of programmable switch 102, and/or data used in executing such instructions, such as indicators 14 or reliability metadata 16. Circuitry 132 can include circuitry such as an ASIC, a microcontroller, a DSP, an FPGA, hard-wired logic, analog circuitry and/or a combination thereof. In some implementations, circuitry 132 can include an SoC, which may be combined with memory 134.

As discussed in more detail below, cache monitoring module 10 and inspection module 12 can include instructions for implementing processes such as those discussed with reference to FIGS. 4 and 6 to generate reliability metadata and to enable network controller 120 to predict or determine which network devices in the distributed system are unreliable or more error prone. Network controller 120 may then adjust usage of network devices based on the determined or predicted reliability of one or more network devices, as discussed in more detail below with reference to FIGS. 7 and 8.

Network controller 120 in the example of FIG. 2 maintains global reliability metadata 24, which may include a table or other type of data structure, such as a Key Value Store (KVS). Controller 120 receives reliability metadata updates or notifications from programmable switches 102 and/or aggregated switch 104 via interface 128 indicating updates or changes to the reliability metadata maintained by the programmable switches, such as reliability metadata 16.

Processor 124 of network controller 120 executes failure indication module 22 to determine or predict a reliability of network devices and communication links based on global reliability metadata 24 and notify the programmable switches of adjustments to the usage of different network devices or communication links, as needed. Processor 124 can include circuitry such as a CPU, a GPU, a microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Network controller 120 communicates with programmable switches 102 via interface 128, which is configured to interface with ports of programmable switches 102, and may interface according to a standard, such as Ethernet.

As will be appreciated by those of ordinary skill in the art with reference to the present disclosure, other implementations may include a different arrangement or number of components, or modules than shown in the example of FIG. 2. For example, in some implementations, network device 108 may not include storage device 121, or two programmable switches 102 may be used for a single server rack for redundancy. In addition, the arrangement shown for programmable switch 102 in FIG. 2 may also apply to aggregated switch 104 in some implementations.

Figure 3:
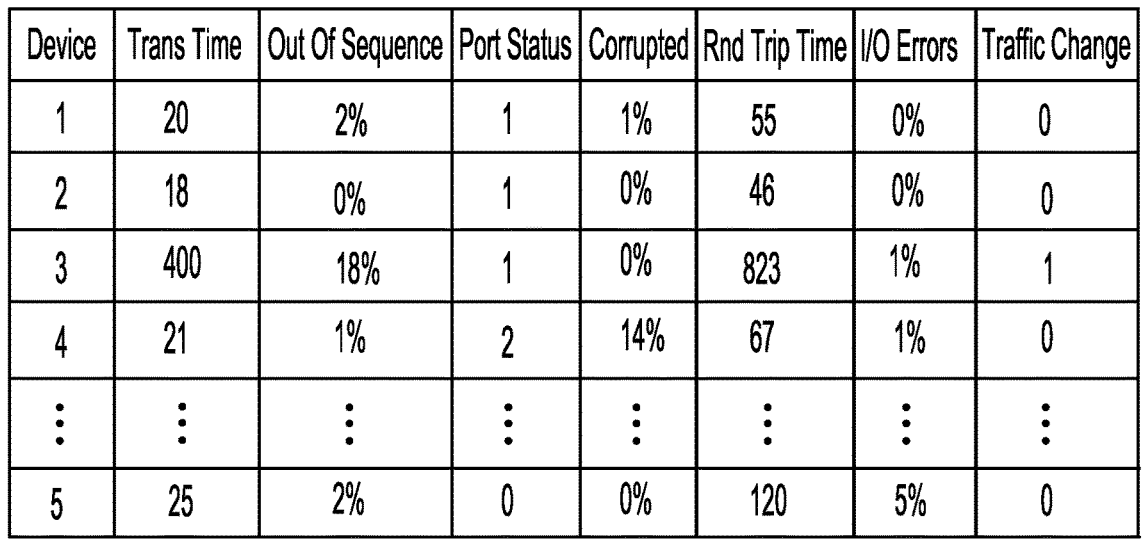
FIG. 3 illustrates an example of reliability metadata generated by a programmable switch according to one or more embodiments.

FIG. 3 illustrates an example of reliability metadata 16 at programmable switch 102 according to one or more embodiments. In the example of FIG. 3, reliability metadata 16 may be stored as a table or other type of data structure such as a KVS. For example, reliability metadata 16 can include a single data structure or may be formed of multiple data structures stored at a programmable switch 102, which may include a memory directly connected to and used by programmable switch 102 (e.g., memory 134 in FIG. 2). Global reliability metadata 24 stored by network controller 120 may include similar information as that shown for reliability metadata 16 of FIG. 3, but with reliability metadata associated with network devices throughout the distributed system.

As shown in FIG. 3, reliability metadata 16 includes device identifiers that identify different network devices used for the distributed system (e.g., a distributed memory system and/or a distributed processing system) and that communicate with the programmable switch 102 directly or indirectly. In implementations where reliability metadata is generated or stored by aggregated switches 104, the device identifiers can identify different network devices that communicate with the aggregated switch 104 directly or indirectly. In some implementations, the programmable switches can identify the network devices using a network address for the network device. The network address may be used in some implementations as the device identifier in reliability metadata 16.

In the example of FIG. 3, reliability metadata 16 includes metadata for each network device communicating with the programmable switch, such as an average transmission time for packets received from the network device, a percentage of packets that are received out of order, a port status for the port that communicates with the network device (e.g., on, off, rapidly changing between on and off), a percentage of packets received from the network device that have corrupted data, an average roundtrip time for a response to be returned from the network device for a request sent to the network device, a percentage of I/O errors reported by the network device, and a change in traffic for the network device, such as a sudden drop in traffic. Other implementations of reliability metadata 16 can include different reliability metadata, such as a total count of metrics over a certain period of time instead of percentages for out of sequence messages, corrupted data, or I/O errors.

The transmission time can be determined or generated by the programmable switch by identifying a timestamp in a packet received from a network device and subtracting the timestamp time from a current time. As noted above, the programmable switch can parse the headers of a packet to identify indicators in the packet, such as a timestamp indicating when the packet was sent. In some implementations, a match-action table of the programmable switch may be used to quickly calculate the transmission time and store the transmission time or to average the transmission time with other transmission times for the network device for storage in reliability metadata 16. A long transmission time can indicate a reliability issue with the network device sending the packet or the communication link between the network device sending the packet and the programmable switch.

The out of sequence percentage or count can represent a number of messages or packets that are received out of order. Protocols such as NVMe can include a sequence number in messages that are encapsulated in the packet to indicate an order for data that is sent that exceeds a maximum data size and needs to be broken up into a series of messages. The sequence number can be used by a receiving node or network device to ensure the payload or data sent in the series of messages is properly assembled. The programmable switch can inspect the packets to determine if the series of messages are received in the proper order. When messages are received out of order, the programmable switch can increment or adjust the percentage or average of sequenced messages received from the network device that are received out of sequence. The receipt of out of sequence messages can indicate that the network device or the communication link between the programmable switch and the network device may not be reliable since packets may be dropped or delayed in route to the programmable switch.

The port status shown in reliability metadata 16 in FIG. 3 can represent a status of a port or interface for a communication link with the network device. For example, a port status of "1" in FIG. 3 can indicate that the port or interface is operating with a continuous "on", ready, or powered state. A port status of "0" on the other hand, can indicate that the port or interface is "off", unavailable, or not powered. In the example of FIG. 3, a port status of "2" can indicate that the port or interface is fluctuating between "on" and "off" states, which may indicate that the port or communication link is having connectivity problems. Other implementations may classify the fluctuating or power cycling status with the "off" status (i.e., "0" in FIG. 3).

The corrupted indicator in reliability metadata 16 can indicate a percentage or count of packets that have data that has been corrupted or otherwise modified from an original value. In some implementations, the programmable switch can identify a CRC value in a packet from the network device and calculate a new CRC value using data in the packet. The programmable switch may then compare the CRC value identified in the packet with the new CRC value calculated by the programmable switch to determine if the CRC values match. If the CRC values do not match, a count for a number of corrupted packets received from the network device can be incremented. The example of reliability metadata 16 in FIG. 3 represents this count of corrupted packets as a percentage of the total packets received from the network device. Other implementations may instead use a total count over a predetermined period of time or another indicator such as a level to indicate a relative number of packets received with corrupted data. In addition, the programmable switch may correct the data using the CRC value in some implementations where corrupted data is received. In other cases, the programmable switch may drop the packet if the data cannot be corrected.

In cases where the programmable switch forwards a request from an originating network device, such as a write request or a read request to a destination network device, the programmable switch can keep track of when the request was sent and wait for a response from the destination network device acknowledging performance of the request. The programmable switch may then compare the time the request was sent from the programmable switch with the time the response was received by the programmable switch to calculate the round trip time. The requests sent by the programmable switch to the destination network device can come from other originating network devices that are routed via the programmable switch. In this regard, the programmable switch may first identify an indicator such as an operation code or op code indicating whether the packet to be sent to the destination network device include a request that will result in an acknowledgment from the destination network device, such as a read or write request. The programmable switch can associate the request that is sent with the acknowledgment received by identifying the source and destination addresses for the network devices before forwarding the request and the acknowledgment to their intended locations.

The I/O errors in reliability metadata 16 can indicate an amount of errors in reading and/or writing data in a memory of the network device. This information can come from the network device itself, such as with the use of I/O monitoring module 20 shown in FIGS. 1 and 2. For example, a network device may keep track of a number of reads and/or writes to a shared memory of the network device that encounter an error, such as an unrecoverable error or a parity error. The network device may periodically provide this information to the programmable switch to update reliability metadata 16. The example of reliability metadata 16 in FIG. 3 represents this as a percentage of a total number of reads and writes by the network device, but other implementations may indicate this count of I/O errors differently, such as with a total number of errors or a total number of errors within a predetermined period of time. In some implementations, the I/O error metadata may be collected by the network device using an eBPF filter.

The traffic change metadata provided in FIG. 3 can represent whether the traffic (i.e., number of packets) sent by or received from the network device has decreased below a threshold amount. This may indicate that the network device or the communication link between the programmable switch and the network device is not functioning properly. In other implementations, the programmable switch may monitor other operations of the network device, such as a number of packets that are dropped from the network device as a result of corrupted data or messages received from the network device. In this regard, the programmable switch may use an eBPF program to monitor the operations of the network device.

Reliability metadata 16 can be updated by the programmable switch to add new network devices communicating with the programmable switch or to remove network devices that have not communicated with the programmable switch during a predetermined period of time (e.g., 5 minutes). In some implementations, reliability metadata 16 may include metadata indicating when the reliability metadata 16 for a network device was last updated by the programmable switch to remove reliability metadata for inactive network devices.

As discussed in more detail below, the programmable switch sends some or all of reliability metadata 16 to network controller 120 so that the network controller 120 can update its own global reliability metadata 24 and use failure indication module 22 to predict or determine the reliability of network devices and communication links used for the distributed system. The controller 120 can then adjust the usage of certain network devices and/or communication links to shift usage away from unreliable network devices and/or communication links toward more reliable network devices and/or communication links.

As will be appreciated by those of ordinary skill in the art with reference to the present disclosure, reliability metadata 16 may include different information than shown in FIG. 3. For example, some implementations of reliability metadata 16 may include other metadata for monitored operations, such as a count of dropped packets received from the network device or corrupted messages received from the network device. As another example variation, a last updated column can be included for indicating when reliability metadata for a network device was last updated to identify inactive network devices and free up memory for storing reliability metadata 16.

EXAMPLE PROCESSES

Figure 4:
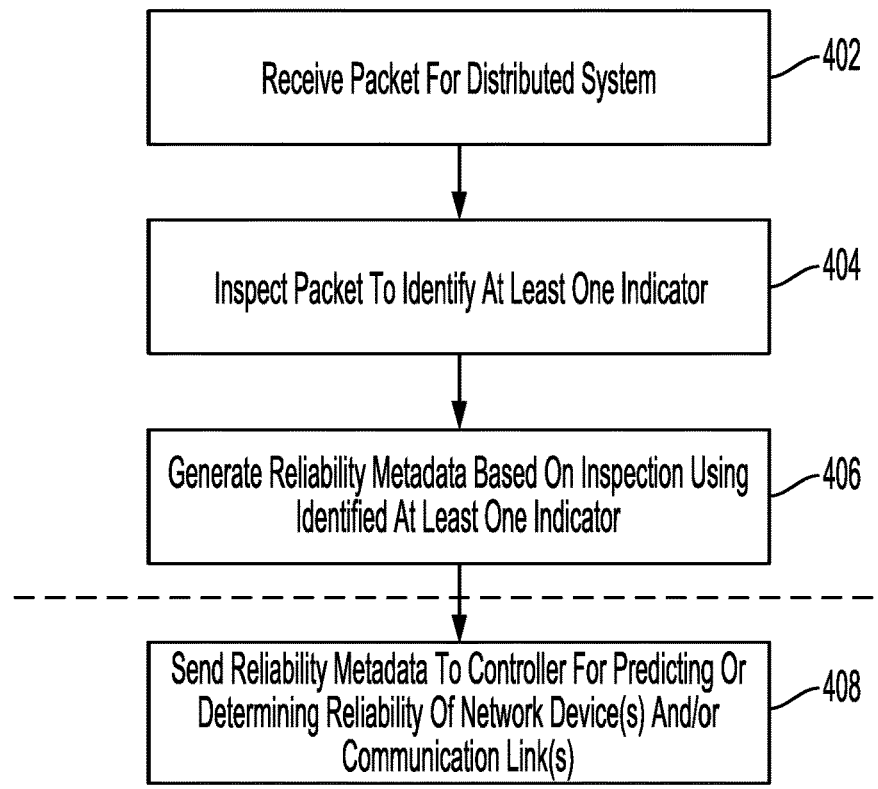
FIG. 4 is a flowchart for a reliability metadata generation process according to one or more embodiments.

FIG. 4 is a flowchart for a reliability metadata generation process according to one or more embodiments. The process of FIG. 4 may be performed by, for example, circuitry 132 of programmable switch 102 executing inspection module 12 in FIG. 2.

In block 402, the programmable switch receives a packet for a distributed system, such as for a distributed memory system or a distributed processing system implemented at nodes or network devices of network 100 in FIG. 1. The packet may be identified by the programmable switch as being for the distributed system by parsing the packet to identify a header or other field indicating an address for the distributed system, such as an address for a shared memory.

In block 404, the programmable switch inspects the packet to identify at least one indicator for generating reliability metadata. In some implementations, the programmable switch may use inspection module 12 to perform deep packet inspection to identify indicators such as, for example, a timestamp for when the packet was sent, a CRC value or other error detection values for data included in the packet, a message acknowledgment, or a message sequence number indicating an order for data in the packet relative to data sent in other packets. The indicators may be temporarily stored by the programmable switch, as with indicators 14 in FIGS. 1 and 2, for generating reliability metadata associated with a network device.

In block 406, the programmable switch generates reliability metadata associated with a network device based on the inspection in block 404 using at least one indicator. In some implementations, the programmable switch may have programmed pipelines or match-action tables that perform operations using the identified indicators, such as calculating packet transmission time, determining if a message included in the packet has been received out of sequence, calculating and comparing a CRC value or other error checking value, calculating a round trip time for an acknowledgment to be received in response to an earlier packet sent by the programmable switch, or identifying a data error included in the packet. As discussed in more detail below with reference to FIGS. 5 and 6, the programmable switch may generate additional reliability metadata based on monitored operations of a network device or of a port or interface of the programmable switch.

In block 408, the programmable switch sends reliability metadata generated in block 406 to network controller 120 for predicting or determining a reliability of at least one of the network device and a communication link for the network device and the programmable switch. The programmable switch may send the reliability metadata as part of a background activity periodically, in response to receiving a request from the controller for reliability metadata, and/or in response to certain changes in the reliability metadata, such as changes in transmission time or traffic that exceed a threshold level. The dashed line in FIG. 4 indicates that the sending of the reliability metadata to the controller may occur at a different time from when the reliability metadata is generated. In some implementations, the programmable switch may send the most recently updated reliability metadata or only the reliability metadata that has changed since reliability metadata was last sent to the controller.

Those of ordinary skill in the art will appreciate with reference to the present disclosure that the order of blocks for the reliability metadata generation process of FIG. 4 may differ in other implementations. For example, in some implementations, many packets may be inspected in block 404 before reliability metadata is generated in block 406, or reliability metadata may be generated multiple times in block 406 before sending the reliability metadata to the controller in block 408.

Figure 5:
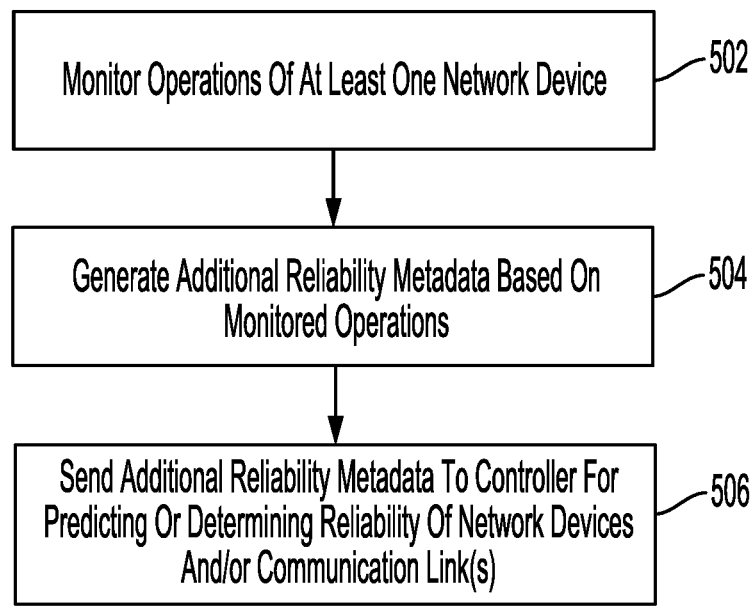
FIG. 5 is a flowchart for a reliability metadata generation process based on monitored operations of a network device according to one or more embodiments.

FIG. 5 is a flowchart for a reliability metadata generation process based on monitored operations of a network device according to one or more embodiments. The process of FIG. 5 may be performed by, for example, circuitry 132 of programmable switch 102 executing monitoring module 10 and/or a processor 116 of a network device 108 executing I/O monitoring module 20, which may be implemented as an eBPF.

In block 502, the programmable switch monitors operations of at least one network device using its programmed pipeline. The monitored operations can include, for example, changes in data traffic for the network device, packet drops for packets received from the network device, and corrupted messages received from the network device.

In block 504, the programmable switch generates additional reliability metadata based on the monitored operations. For example, the programed pipeline may update reliability metadata 16 if a packet received from a network device is dropped due to corrupted data, if the number of packets received from the network device drops below a threshold number of packets per minute, or if an error message is received from the network device. In some implementations, the program executed by the programmable switch may work in conjunction with an eBPF executed by the network device that may report error data to the programmable switch to generate additional reliability metadata associated with the network device.

In block 506, the programmable switch sends the additional reliability metadata generated in block 504 to the network controller for predicting or determining a reliability of at least one of the network device and a communication link for the network device and the programmable switch. The programmable switch may send the additional reliability metadata as part of a background activity periodically, in response to receiving a request from the controller for reliability metadata, and/or in response to a change in the reliability metadata. In some implementations, the programmable switch may send the most recently updated reliability metadata or only the reliability metadata that has changed since reliability metadata was last sent to the controller.

Those of ordinary skill in the art will appreciate with reference to the present disclosure that the order of blocks for the reliability metadata generation process of FIG. 5 may differ in other implementations. For example, in some implementations, metadata may be generated repeatedly in block 504 before sending metadata to the network controller in block 506.

Figure 6:
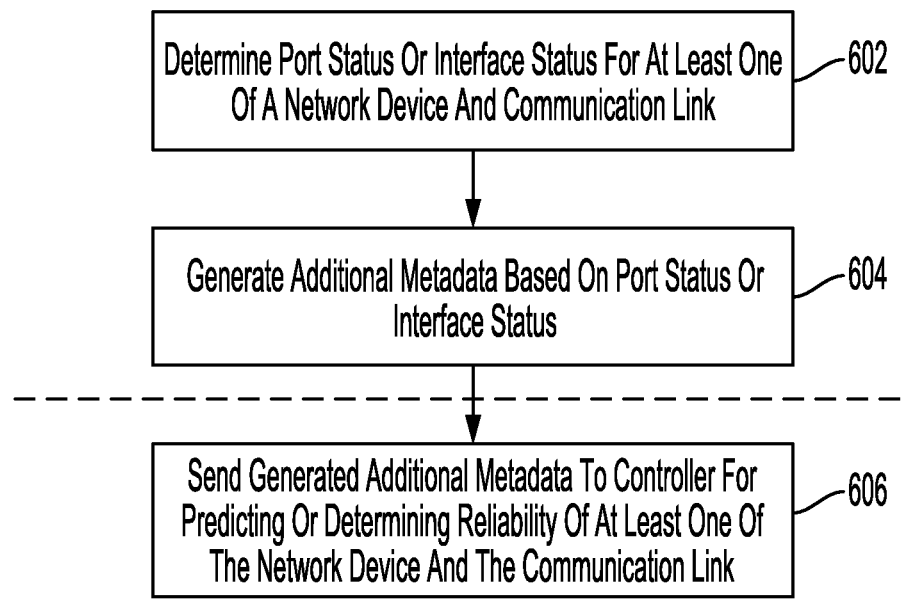
FIG. 6 is a flowchart for a reliability metadata generation process using a port status or an interface status of a programmable switch according to one or more embodiments.

FIG. 6 is a flowchart for a reliability metadata generation process using port status or interface status of a programmable switch according to one or more embodiments. The process of FIG. 6 may be performed by, for example, circuitry 132 of programmable switch 102 executing monitoring module 10 in FIG. 2.

In block 602, the programmable switch determines a port or interface status for one or more network devices and corresponding communication links. In some implementations, monitoring module 10 may monitor the power state of the connections to the ports of the programmable switch (e.g., ports 130 in FIG. 2). A P4 program, for example, may be used to monitor the hardware state of the ports in some implementations.

In block 604, the programmable switch generates additional reliability metadata based on the port status or interface status determined in block 602. For example, the programmable switch may update the reliability metadata to represent a power state of the ports, such as whether the connection remains powered, loses power, or repeatedly cycles between having power and no power within a predetermined period of time. In other cases, the programmable switch may update the reliability metadata to represent an interface status, such as whether a ready status or an unavailable status is determined by the programmable switch for a communication link used for communicating with the network device.

In block 606, the programmable switch sends the additional metadata generated in block 604 to the network controller for the distributed system for predicting or determining a reliability of the one or more network devices and corresponding communication links. The programmable switch may send the additional reliability metadata as part of a background activity periodically, in response to receiving a request from the controller for reliability metadata, and/or in response to a change in the port status or interface status. The dashed line in FIG. 6 indicates that the sending of the additional reliability metadata to the controller may occur at a different time from when the additional reliability metadata is generated. In some implementations, the programmable switch may send the most recently updated reliability metadata or only the reliability metadata that has changed since reliability metadata was last sent to the controller.

Figure 7:
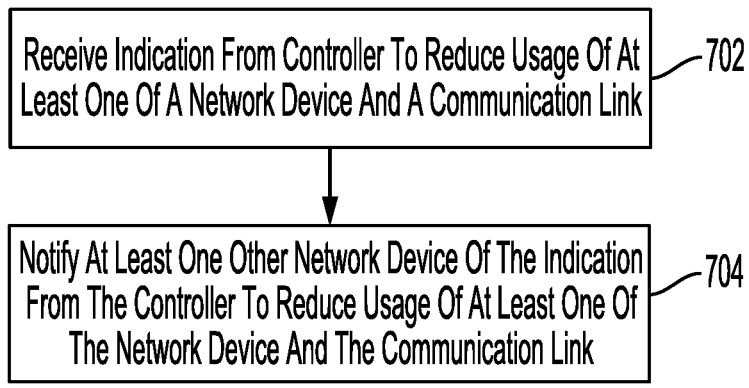
FIG. 7 is a flowchart for a usage reduction notification process according to one or more embodiments.

FIG. 7 is a flowchart for a usage reduction notification process according to one or more embodiments. The process of FIG. 7 may be performed by, for example, circuitry 132 of programmable switch 102 in FIG. 2.

In block 702, the programmable switch receives an indication from the network controller to reduce usage of at least one of a network device and a communication link. The indication may be included in a message from the controller using a custom protocol for the distributed system. In some cases, the indication may indicate an address of a network device that should not be used in the distributed system or that should be used less in the distributed system in favor of other network devices in the distributed system. In other cases, the indication may indicate a communication link that should be avoided, such as with an address for another ToR or aggregate switch. In some implementations, a backup ToR switch may be used in place of a primary ToR switch if the communication link with the primary ToR switch is determined or predicted by the controller to be unreliable. The message from the controller in some implementations may indicate whether a particular network device or communication link is to be avoided completely, as in the case of a network device that is no longer available, or whether its usage is to only be reduced.

In block 704, the programmable switch notifies at least one other network device of the indication from the controller to reduce usage of at least one of the network device and the communication link. The programmable switch may create a new message for the at least one other network device, such as for the network devices in its respective rack 101, using a custom protocol, or may forward the message received from the controller in block 702. In some implementations, the programmable switch may send messages to particular network devices that are known by either the programmable switch or the controller to communicate with the network device or using the communication link that is to have reduced usage. For example, the programmable switch and/or the controller may include a directory, such as for NVMe namespaces, that may indicate addresses for active network devices that communicate with a network device that is to have reduced usage.

Figure 8:
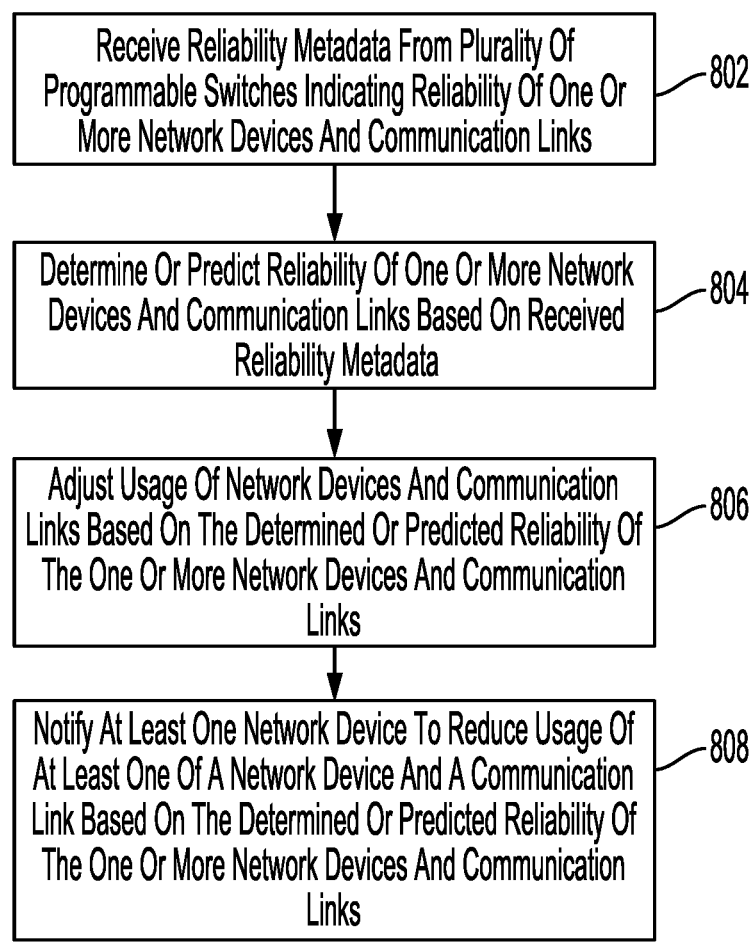
FIG. 8 is a flowchart for a reliability prediction or reliability determination process according to one or more embodiments.

FIG. 8 is a flowchart for a reliability prediction or reliability determination process according to one or more embodiments. The process of FIG. 8 may be performed by, for example, processor 124 of network controller 120 executing failure indication module 22.

In block 802, the controller receives reliability metadata from a plurality of programmable switches indicating reliability of one or more network devices and communication links used fora distributed system. As discussed above with reference to FIGS. 4 to 6, the programmable switches in network 100 may generate and/or collect their own reliability metadata (e.g., reliability metadata 16 in FIG. 3) based on the communication links used by the programmable switch and the network devices that communicate with the programmable switch. The controller can receive updates from each of the programmable switches that send reliability metadata to update a global reliability metadata for the distributed system (e.g., global reliability metadata 24 in FIG. 2). In some implementations, the controller may periodically request reliability metadata from the programmable switches. In other cases, the programmable switches may send their reliability metadata to the controller without a request from the controller.

In block 804, the controller determines or predicts a reliability of one or more network devices and communication links based on the reliability metadata received from the programmable switches. In some implementations, the controller may use some or all of the reliability metadata as inputs to a function that has been determined by machine learning to predict the reliability of the one or more network devices and communication links. For example, failure indication module 22 can apply previously learned failure patterns to the reliability metadata and predict whether there is more than a threshold likelihood of a future failure of a network device or communication link. The failure indication module 22 may use different classification and prediction algorithms, such as a random forest, a neural network, or a decision tree algorithm.

In block 806, the controller adjusts usage of network devices and communication links based on the determined or predicted reliability of one or more network devices and communication links. The adjustment in usage can include a load balancing that is performed by the controller to redistribute or transfer traffic and/or workloads from network devices and communication links that are determined to have more than a threshold level of unreliability. In cases where a network device or communication link has been determined to be completely unreliable, as in the case of an unavailable network device, the controller may adjust traffic to prevent the use of the network device.

In block 808, the controller notifies at least one network device to reduce usage of at least one of a network device and a communication link based on the determined or predicted reliability of one or more network devices and communication links. The notifications can be sent to the network devices via a programmable switch as discussed above for the notification process of FIG. 7. The notifications may use a custom protocol for management of the distributed system, which may provide indications for whether the use of a network device or communication link should be completely stopped or whether its usage should be reduced.

Those of ordinary skill in the art will appreciate with reference to the present disclosure that the order of blocks for the reliability prediction or reliability determination process of FIG. 8 may differ in other implementations. For example, the adjustment of block 806 may instead or additionally occur at programmable switches or network devices that perform load balancing or scheduling of requests for the distributed system.

As discussed above, the foregoing generation and collection of reliability metadata by in-line programmable switches can improve the fault tolerance of distributed systems by identifying potential failures before they cause data loss or downtime. In addition, the collection of reliability data from programmable switches throughout the network by the network controller can enable the use of predictive algorithms.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch, comprising:
a plurality of ports for communicating with a plurality of network devices used for a distributed system, wherein the programmable switch is configured to route messages between network devices of the plurality of network devices; and
circuitry configured to:
receive packets via a port of the plurality of ports for the distributed system;
identify message sequence numbers in the received packets for messages sent from a network device used for the distributed system;
generate reliability metadata associated with the network device based at least in part on the identified message sequence numbers, wherein the generated reliability metadata includes an indication of an amount of out-of-sequence messages received by the programmable switch from the network device; and
send the generated reliability metadata to a controller for the distributed system for predicting or determining a reliability of at least one of the network device and a communication link for the network device and the programmable switch.

2. The programmable switch of claim 1, wherein the circuitry is further configured to generate additional reliability metadata indicating a round trip time for a request forwarded by the programmable switch to be acknowledged by a receiving network device.

3. The programmable switch of claim 1, wherein the circuitry is further configured to:
identify a timestamp in a packet received from the network device by the programmable switch; and
in generating the reliability metadata, the circuitry is further configured to calculate a packet transmission time using the timestamp.

4. The programmable switch of claim 1, wherein a packet received from the network device by the programmable switch includes a Cyclic Redundancy Check (CRC) value, and wherein in generating the reliability metadata, the circuitry is further configured to:
calculate a new CRC value using data in the packet;
determine whether the calculated new CRC value equals the CRC value identified in the packet; and
in response to determining that the calculated new CRC value does not equal the CRC value identified in the packet, increment a count for a number of corrupted packets associated with the network device.

5. The programmable switch of claim 1, wherein the circuitry is further configured to:
monitor operations for the network device;
generate additional reliability metadata based on the monitored operations; and
send the generated additional reliability metadata to the controller for predicting or determining the reliability of at least one of the network device and the communication link for the network device and the programmable switch.

6. The programmable switch of claim 5, wherein the monitored operations include at least one of changes in data traffic for the network device, packet drops for packets from the network device, and corrupted messages received from the network device.

7. The programmable switch of claim 1, wherein the circuitry is further configured to:
determine a port status or interface status for the communication link;
generate additional reliability metadata based on the port status or interface status for the communication link; and
send the generated additional reliability metadata to the controller for predicting or determining the reliability of at least one of the network device and the communication link.

8. The programmable switch of claim 1, wherein the circuitry is further configured to:
receive an indication from the controller to reduce usage of at least one of the network device and the communication link; and
notify at least one other network device of the indication from the controller to reduce usage of at least one of the network device and the communication link.

9. A method performed by a programmable switch, comprising:
routing messages between network devices in a distributed system;
receiving packets from a network device for the distributed system;
inspecting the received packets, wherein inspection of the received packets includes identification of message sequence numbers in the received packets;
generating reliability metadata associated with the network device based at least in part on the identification of the message sequence numbers, wherein the generated reliability metadata includes an indication of an amount of out-of-sequence messages received by the programmable switch from the network device; and
sending the generated reliability metadata to a controller for the distributed system for predicting or determining a reliability of at least one of the network device and a communication link used for the distributed system.

10. The method of claim 9, further comprising generating additional reliability metadata indicating a round trip time for a request forwarded by the programmable switch to be acknowledged by a receiving network device.

11. The method of claim 9, wherein generating the reliability metadata further includes calculating a packet transmission time using a timestamp identified in a packet received from the network device.

12. The method of claim 9, wherein generating the reliability metadata further includes:
calculating a Cyclic Redundancy Check (CRC) value using data in a packet received from the network device;
determining whether the calculated CRC value equals an identified CRC value identified in the packet; and
in response to determining that the calculated CRC value does not equal the identified CRC value, incrementing a count for a number of corrupted packets associated with the network device.

13. The method of claim 9, further comprising:
monitoring operations for the network device using an extended Berkeley Packet Filter (eBPF);
generating additional reliability metadata based on the monitored operations; and
sending the generated additional reliability metadata to the controller for predicting or determining the reliability of at least one of the network device and the communication link.

14. The method of claim 13, wherein the monitored operations include at least one of changes in data traffic for the network device, packet drops for packets from the network device, and corrupted messages received from the network device.

15. The method of claim 9, further comprising:
determining a port status or interface status for the communication link;
generating additional reliability metadata based on the port status or interface status; and
sending the generated additional reliability metadata to the controller for predicting or determining the reliability of at least one of the network device and the communication link.

16. The method of claim 9, further comprising:
receiving an indication from the controller to reduce usage of at least one of the network device and the communication link; and
notifying at least one other network device of the indication from the controller to reduce usage of at least one of the network device and the communication link.

17. A controller for a distributed system, the controller comprising:
an interface configured to communicate with a plurality of programmable switches configured to route messages between network devices in the distributed system; and
means for:
receiving reliability metadata from a programmable switch of the plurality of programmable switches, the reliability metadata associated with a network device used for the distributed system, wherein the received reliability metadata is generated by the programmable switch based on message sequence numbers identified by the programmable switch in packets received by the programmable switch from the network device and indicates an amount of out-of-sequence messages received by the programmable switch from the network device; and
using the received reliability metadata to predict or determine a reliability of at least one of the network device and a communication link for the network device and the programmable switch.

18. The controller of claim 17, further comprising means for receiving additional reliability metadata indicating a round trip time for a request forwarded by the programmable switch to be acknowledged by a receiving network device.

19. The controller of claim 17, further comprising means for adjusting a usage of network devices and communication links for the distributed system based on the determined or predicted reliability of the at least one of the network device and the communication link.

20. The controller of claim 17, further comprising means for notifying at least one network device to reduce usage of at least one of the network device and the communication link based on the determined or predicted reliability of the at least one of the network device and the communication link.

* * * * *